US008250560B2

(12) United States Patent
Hirayama (10) Patent No.: US 8,250,560 B2
(45) Date of Patent: Aug. 21, 2012

(54) INFORMATION PROCESSING APPARATUS (75) Inventor: Noriyuki Hirayama, Fuchu (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 1252 days.

(21) Appl. No.: 11/714,751

(22) Filed: Mar. 6, 2007

(65) Prior Publication Data

US 2007/0226448 A1 Sep. 27, 2007

(30) Foreign Application Priority Data

Mar. 22, 2006 (JP) ................................ 2006-078280

(51) Int. Cl.
*G06F 9/44* (2006.01)
*G06F 9/445* (2006.01)

(52) U.S. Cl. ........................................ 717/168; 717/174

(58) Field of Classification Search ........................ None
See application file for complete search history.

(56) References Cited

U.S. PATENT DOCUMENTS

| 4,763,305 | A | 8/1988 | Kuo | |
|---|---|---|---|---|
| 6,061,449 | A * | 5/2000 | Candelore et al. | 380/28 |
| 6,205,548 | B1 * | 3/2001 | Hasbun | 713/2 |
| 6,467,087 | B1 * | 10/2002 | Yang | 717/168 |
| 7,043,166 | B2 * | 5/2006 | Parry et al. | 399/12 |
| 7,340,581 | B2 * | 3/2008 | Gorobets et al. | 711/202 |
| 7,380,243 | B2 * | 5/2008 | Sugishita et al. | 717/168 |
| 7,770,165 | B2 * | 8/2010 | Olson et al. | 717/168 |
| 2001/0027517 | A1 * | 10/2001 | Kato | 713/1 |
| 2002/0077094 | A1 * | 6/2002 | Leppanen | 455/420 |
| 2002/0129245 | A1 * | 9/2002 | Cassagnol et al. | 713/168 |
| 2004/0117785 | A1 * | 6/2004 | Kincaid | 717/170 |
| 2005/0097543 | A1 * | 5/2005 | Hirayama | 717/168 |
| 2005/0160217 | A1 * | 7/2005 | Gonzalez et al. | 711/6 |
| 2007/0118683 | A1 * | 5/2007 | Yang et al. | 711/103 |
| 2007/0211891 | A1 * | 9/2007 | Shamoon et al. | 380/28 |
| 2007/0226448 | A1 * | 9/2007 | Hirayama | 711/170 |
| 2008/0072068 | A1 * | 3/2008 | Wang et al. | 713/191 |

FOREIGN PATENT DOCUMENTS

| EP | 0331643 A2 | 6/1989 |
|---|---|---|
| EP | 1331643 A | 7/2003 |
| JP | 2003-032242 | 1/2003 |
| JP | 2003-91420 | 3/2003 |
| JP | 2003-173260 | 6/2003 |
| JP | 2004-129227 | 4/2004 |

(Continued)

OTHER PUBLICATIONS

Notice of Reasons for Rejection mailed Jul. 5, 2011 in corresponding Japanese Patent Application No. JP 2006-078280.

(Continued)

*Primary Examiner* — don wong
*Assistant Examiner* — Marina Lee
(74) *Attorney, Agent, or Firm* — Knobbe Martens Olson & Bear, LLP (57) ABSTRACT

According to one embodiment, an information processing apparatus includes memory in which first firmware is stored; a controller to execute the firmware; a storage device in which update data corresponding to second firmware that can be used to update the first firmware stored in memory; and a processing unit configured to (a) transfer the update data, and (b) indicate which regions of the memory require updating; and an updating unit configured to rewrite a region in the memory using the update data in response to the indication of which regions of the memory require updating.

5 Claims, 8 Drawing Sheets

FOREIGN PATENT DOCUMENTS

| | | |
|---|---|---|
| JP | 2004-259077 | 9/2004 |
| JP | 2005-141457 | 6/2005 |
| JP | 2006-024099 | 1/2006 |
| WO | WO 2005/088447 A1 | 9/2005 |
| WO | WO 2005088447 A1 * | 9/2005 |

OTHER PUBLICATIONS

Office Action mailed on Sep. 27, 2011 in corresponding Japanese Application No. JP 2006-078280.

* cited by examiner

| | Address | Ver.1.03 | Ver.1.02 | Ver.1.01 |
|---|---|---|---|---|
| 1 | ... | No | Yes | Yes |
| 2 | ... | Yes | Yes | Yes |
| 3 | ... | No | No | Yes |
| 4 | ... | No | No | No |
| 5 | ... | No | Yes | Yes |
| 6 | ... | Yes | Yes | Yes |
| 7 | ... | No | No | Yes |
| 8 | ... | No | No | No |
| 9 | ... | No | Yes | Yes |
| 10 | ... | No | No | No |
| ⋮ | ⋮ | ⋮ | ⋮ | ⋮ |

INFORMATION PROCESSING APPARATUS

PRIORITY INFORMATION

This application is based upon and claims the benefit of priority from the prior Japanese Patent Application No. 2006-78280, filed Mar. 22, 2006, the entire contents of which are incorporated herein by reference.

BACKGROUND OF THE INVENTION

1. Field of the Invention

The invention relates to an information processing apparatus that updates firmware stored in a memory.

2. Description of the Related Art

Firmware that controls an information processing apparatus may be stored in memory, such as non-volatile memory. To improve functions and to remove bugs, an updater corresponding to new firmware is provided to a user to update the firmware stored in the nonvolatile memory (Jpn. Pat. Appln. KOKAI Publication No. 2003-173260).

When an updater containing the entire firmware is provided to the user to rewrite the entire nonvolatile memory, regions that otherwise need not be rewritten are also rewritten. Accordingly, even if only a few regions need to be rewritten, the entire nonvolatile memory is rewritten, thus requiring extra time for an update process. The number of times that the nonvolatile memory is rewritten also adds to reduction in the life of the memory.

An updater may be provided which contains separate files corresponding to the respective update target regions of new firmware so that only the update target regions in the nonvolatile memory need to be rewritten. However, this requires a plurality of updaters depending on the versions of the firmware that may be stored in the nonvolatile memory.

SUMMARY OF THE INVENTION

According to one embodiment of the invention, an information processing apparatus includes memory in which first firmware is stored, a controller to execute the first firmware; a storage device in which update data corresponding to second firmware that can be used to update the first firmware stored in memory; a processing unit to selectively transfer the update data as needed to cause updating of said first firmware; and an updating unit that is configured to rewrite a region in the memory with the update data transferred if it is different from corresponding data already in said region of the memory to which the data transferred is to be written. The information processing apparatus may also include a bus over which data is transferred, and may further include an expansion device connected to the bus and in which the memory may be provided. Another embodiment of the invention includes a method of selectively updating first firmware with second firmware in a manner that more efficiently updates only those portions of the first firmware that require updating.

DETAILED DESCRIPTION OF THE PREFERRED EMBODIMENT

Figure 1:
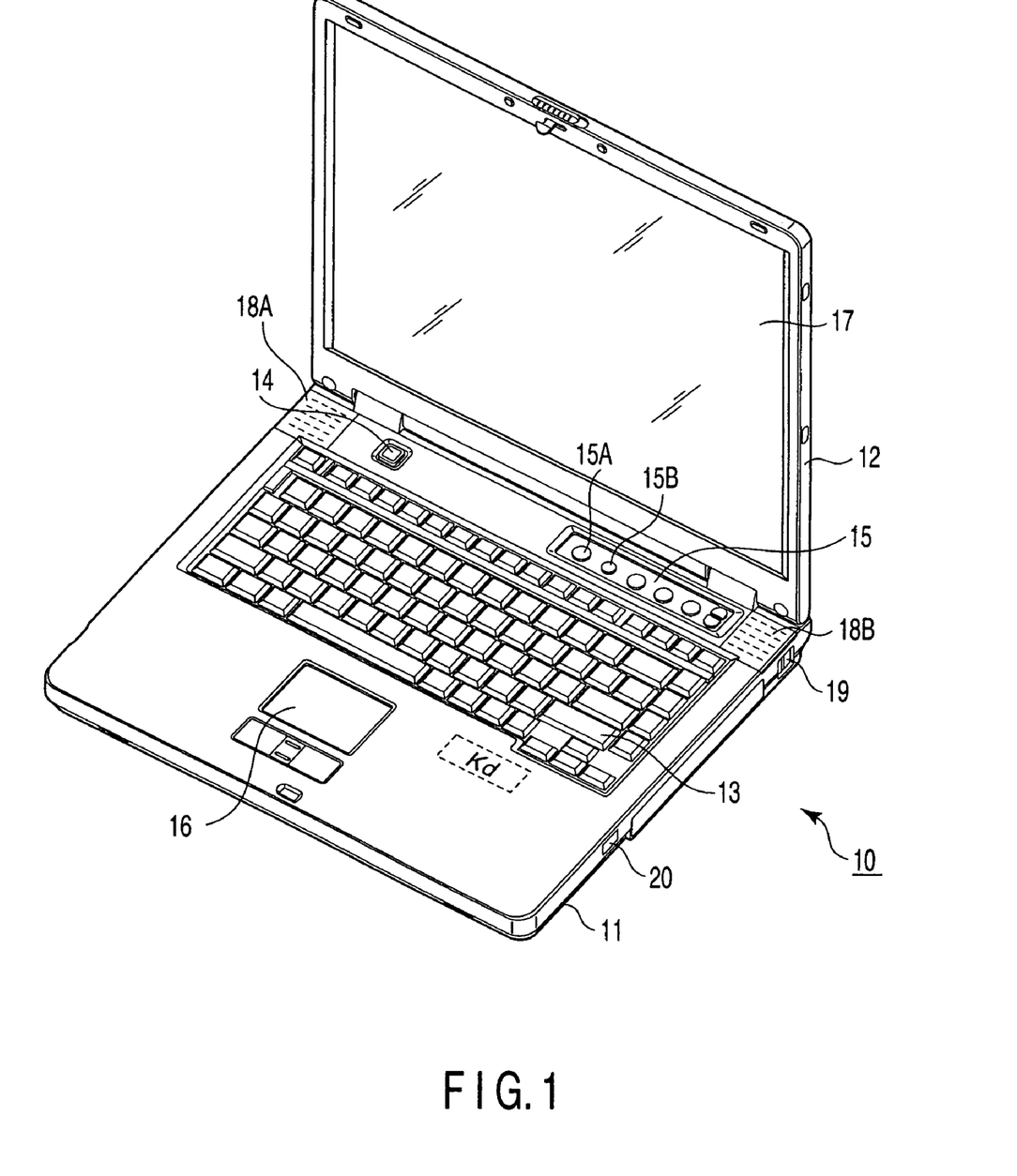
FIG. 1 is an exemplary perspective view showing the appearance of a computer according to an embodiment of the present invention.
Figure 2:
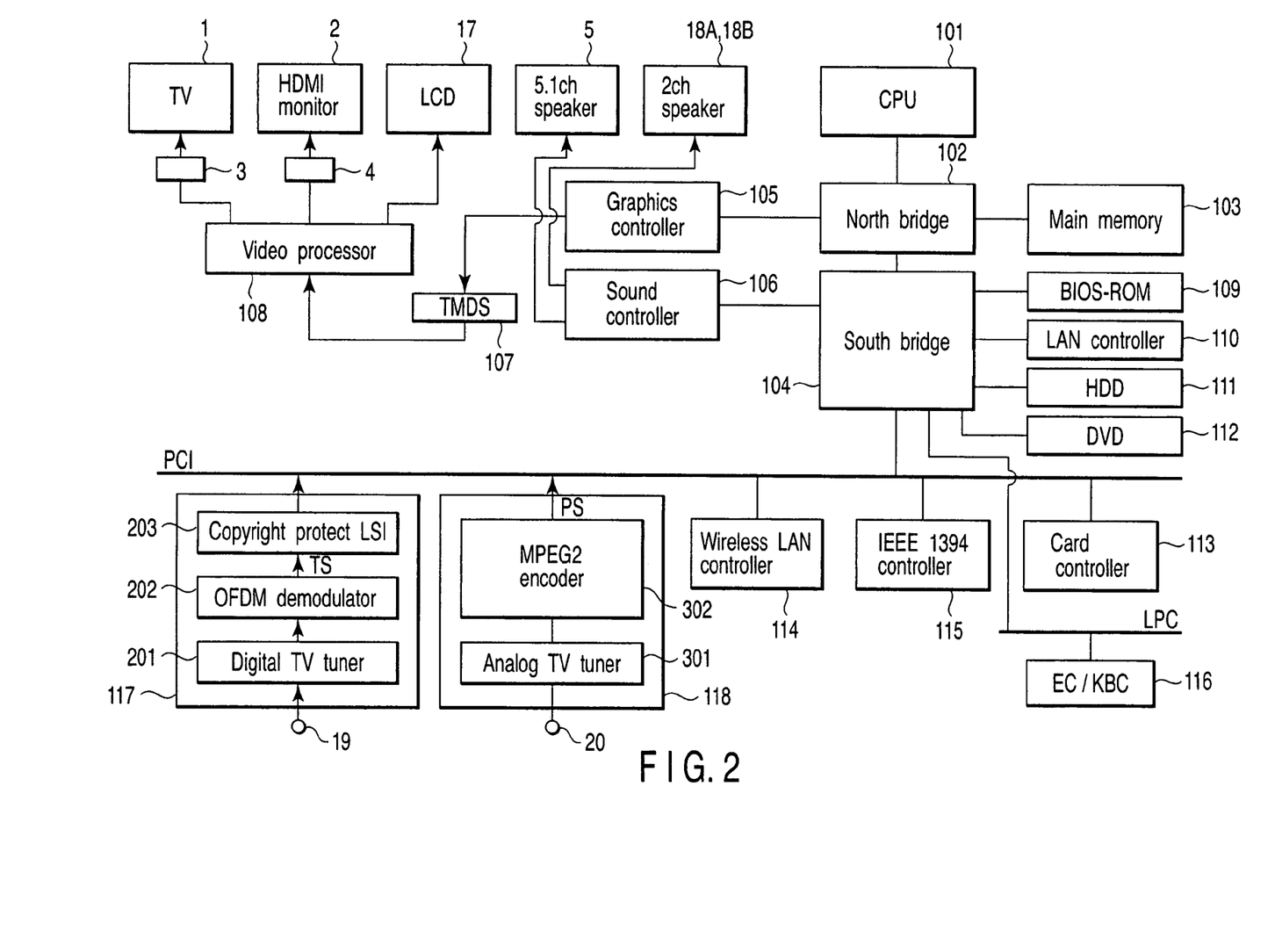
FIG. 2 is an exemplary block diagram showing the system configuration of the computer in FIG. 1.

Various embodiments according to the invention will be described hereinafter with reference to the accompanying drawings. These embodiments are illustrated and described by example only, and are not intended to limit the scope of the invention. With reference to FIGS. 1 and 2, description will be given of configuration of an information processing apparatus according to an embodiment of the invention. The information processing apparatus is implemented as a notebook-type personal computer 10.

FIG. 1 is a perspective view showing that a display unit of the notebook-type personal computer 10 is open. The computer 10 is composed of a computer main body 11 and a display unit 12. A display composed of a thin film transistor liquid crystal display (TFT-LCD) 17 is incorporated into the display unit 12. An LCD display screen 17 is part of the display unit 12.

In one embodiment, the display unit 12 is mounted so as to be pivotable between an open position and a closed position. The computer main body 11 has a thin-box-shaped housing including a keyboard 13, a power button 14, an input operation panel 15, a touch pad 16, and speakers 18A and 18B arranged on its top surface. The power button 14 is used to power on or off the computer 10.

The input operation panel 15 is an input device that inputs an event corresponding to a depressed button to the apparatus. The input operation panel 15 comprises one or more buttons required to actuate function(s). The group of buttons can include a TV actuation button 15A and a DVD/CD actuation button 15B. The TV actuation button 15A actuates a TV function for reproducing and recording TV broadcast program data. When a user depresses the TV actuation button 15A, a TV application program for executing the TV function is executed.

In addition to a main general-purpose operating system, a sub operating system dedicated to processing audio/video (AV) data is installed in the computer 10. The TV application program runs under the sub operating system.

When the user depresses the power button 14, the main operating system is executed. In contrast, in one embodiment, when the user depresses the TV actuation button 15A, the sub operating system is executed instead of the main operating system to automatically execute the TV application program. The sub operating system has only the minimum functions required to execute the AV function. Thus, the time required to boot the sub operating system is much shorter than that required to boot the main operating system. Thus, simply by depressing the TV actuation button 15A, the user can immediately view or record TV programs.

In some implementations, the computer 10 can receive and reproduce both terrestrial digital TV broadcasting and terrestrial analog TV broadcasting. The computer main body 11 has an antenna terminal 19 for terrestrial digital TV broadcasting and an antenna terminal 20 for terrestrial analog TV broadcasting provided on its right side. For terrestrial digital TV broadcasting, the content of broadcast program data can be encrypted. To deal with encrypted broadcast program data, the computer main body 11 has a built-in storage section in which device identification information is pre-stored. The storage section is included in a dedicated LSI for protecting the copyright of digital broadcast program data. The device identification information is used as a device key (Kd) required to decrypt the decrypted broadcast program data. The device identification information is an ID required to identify the computer 10. The device identification information is composed of information that identifies the type of computer 10 and/or its manufacturer. In one implementation, the device identification information is comprises of a pair of a type ID that identifies the type of the computer 10 and the device key Kd corresponding to the type ID. In another implementation, the device identification information comprises a pair of a manufacturer ID that identifies the manufacturer of computer 10 and the device key Kd corresponding to the manufacturer ID. The type ID and manufacturer ID are hereinafter collectively referred to as a device ID.

In terrestrial digital TV broadcasting, a stream obtained by multiplexing a plurality of broadcasting program data is broadcast via a broadcasting wave. In one embodiment, the stream comprises program contents encrypted by an encryption key (Ks), common information (entitlement control message "ECM") obtained by using a work key (Kw: second encrypting key) to encrypt Ks, and some pieces of individual information (entitlement management message "EMM") obtained by using device identification information (device key [Kd]) corresponding to proper individual receivers to encrypt Kw. Each EMM comprises the corresponding device ID.

The computer 10 uses the ECM and EMM contained in the broadcast program data and the device key (Kd) built into the computer main body 11 to generate a encryption key (Ks) for decrypting the encrypted program contents. In this case, the device key (Kd) is used to decrypt the EMM containing the device ID in order to generate Kw. Generated Kw is used to decrypt the ECM in order to generate Ks.

As described above, in one embodiment, the computer 10 and the device key (Kd) in the storage section in the dedicated LSI are built into the computer 10. The dedicated LSI cannot be externally accessed. Thus, the device key (Kd) can be easily prevented from leaking without using any special tamper resistant techniques. Thus, the copyright of broadcast program data can be protected without any dedicated IC card such as a BS Conditional Access System (B-CAS) card.

The DVD/CD actuation button 15B is used to reproduce video content recorded on DVD or CD. When the user depresses the DVD/CD actuation button 15B, a video reproduction application program is executed to reproduce the video content. In one implementation, the video reproduction application program is run under a sub operating system. When the user depresses the DVD/CD actuation button 15B, the sub operating system is executed instead of the main operating system to automatically execute the video reproduction application program.

Now, one embodiment of the system configuration of the computer 10 will be described with reference to FIG. 2.

As shown in FIG. 2, components of the computer 10 may include, but is not limited to, a CPU 101, a north bridge 102, a main memory 103, a south bridge 104, a graphics controller 105, an audio controller 106, a transition minimized differential signaling (TMDS) circuit 107, a video processor 108, BIOS-ROM 109, a LAN controller 110, a hard disk drive (HDD) 111, a DVD drive 112, a card controller 113, a wireless LAN controller 114, an IEEE 1394 controller 115, an embedded controller/keyboard controller (EC/KBC) IC 116, a digital TV broadcasting reception processing section 117, and an analog TV broadcasting reception processing section 118.

The CPU 101 is a processor that controls the operation of the computer 10. CPU 101 executes various systems and application programs such as the main operating system/sub operating system and TV application program which are loaded from the hard disk drive (HDD) 111 into the main memory 103. The CPU 101 executes a system basic input output system (BIOS) stored in the BIOS-ROM 109. The system BIOS is a program for controlling hardware.

The north bridge 102 is a bridge device that connects a local bus for the CPU 101 and the south bridge 104 together. The north bridge 102 also contains a memory controller that controls accesses to the main memory 103. The north bridge 102 also has a function for communicating with the graphics controller 105 via an Accelerated Graphics Port (AGP) bus, a serial bus that complies with the PCI Express standard, or the like.

The graphics controller 105 is a display controller that controls LCD 17 used as a display monitor for the computer 10. Video data generated by the graphics controller 105 is sent to the video processor 108 via the TMDS circuit 107. The video processor 108 executes a video process (image quality adjusting process) for improving the quality of video data from the graphics controller 105. In one embodiment, the video data is sent to LCD 17. In another embodiment, the video data is transmitted to an external TV 1 and an external HDMI monitor via interfaces 3 and 4.

The south bridge 104 controls devices on Low Pin Count (LPC) bus and devices on a Peripheral Component Interconnect (PCI) bus along which data is transferred. The south bridge 104 also contains an Integrated Drive Electronics (IDE) controller that controls the HDD 111 and the DVD drive 112. The south bridge 104 further has a function for executing communication with the audio controller 106.

The audio controller 106 is a sound source device and outputs audio data to be reproduced, to speakers 18A and 18B or an external 5.1-channel speaker system.

The card controller 113 controls a PC card, Secure Digital (SD) card, or the like. The wireless LAN controller 114 is a wireless communication device that executes radio communication that complies with, for example, the IEEE 802.11 standard. The IEEE 1394 controller 115 communicates with external equipment via a serial bus that complies with the IEEE 1394 standards. The embedded controller/keyboard controller (EC/KBC) IC 116 is a one-chip microcomputer in which an embedded controller for power management and a keyboard controller for controlling the keyboard (KB) 13 and touch pad 16 are integrated. The embedded controller/keyboard controller (EC/KBC) IC 116 has a function for powering on or off the computer 10 in response to the user's operation of the power button 14. The embedded controller/keyboard controller IC (EC/KBC) 116 can further power on the computer 10 in response to the user's operation of the TV actuation button 15A and/or DVD/CD actuation button 15B.

The digital TV broadcast reception processing section 117 is a device that receives digital broadcast programs such as those associated with a terrestrial digital TV broadcast. The digital TV broadcasting reception processing section 117 is connected to the antenna terminal 19. As shown in FIG. 2, the digital TV broadcast reception processing section 117 comprises a digital TV tuner 201, an orthogonal frequency division multiplexing (OFDM) demodulator 202, and a copyright protection LSI 203. The digital TV tuner 201 and OFDM demodulator 202 function as a tuner module that receives broadcast program data for terrestrial digital TV broadcast. Terrestrial digital TV broadcasting can utilize MPEG-2 as a compressive encoding scheme for broadcast program data (video and audio). Available video formats can include standard definition (SD) and High Definition (HD).

The tuner module, comprised of the digital TV tuner 201 and OFDM 202, receives a broadcast signal for a particular channel included in TV broadcast signals input through the antenna terminal 19. The tuner module then extracts a transport stream (TS) from the received TV broadcast signal. The transport stream is obtained by multiplexing a plurality of compressively encoded broadcast program data. Terrestrial digital TV broadcasting multiplexes a plurality of programs for each channel (for example, a physical channel).

Figure 3:
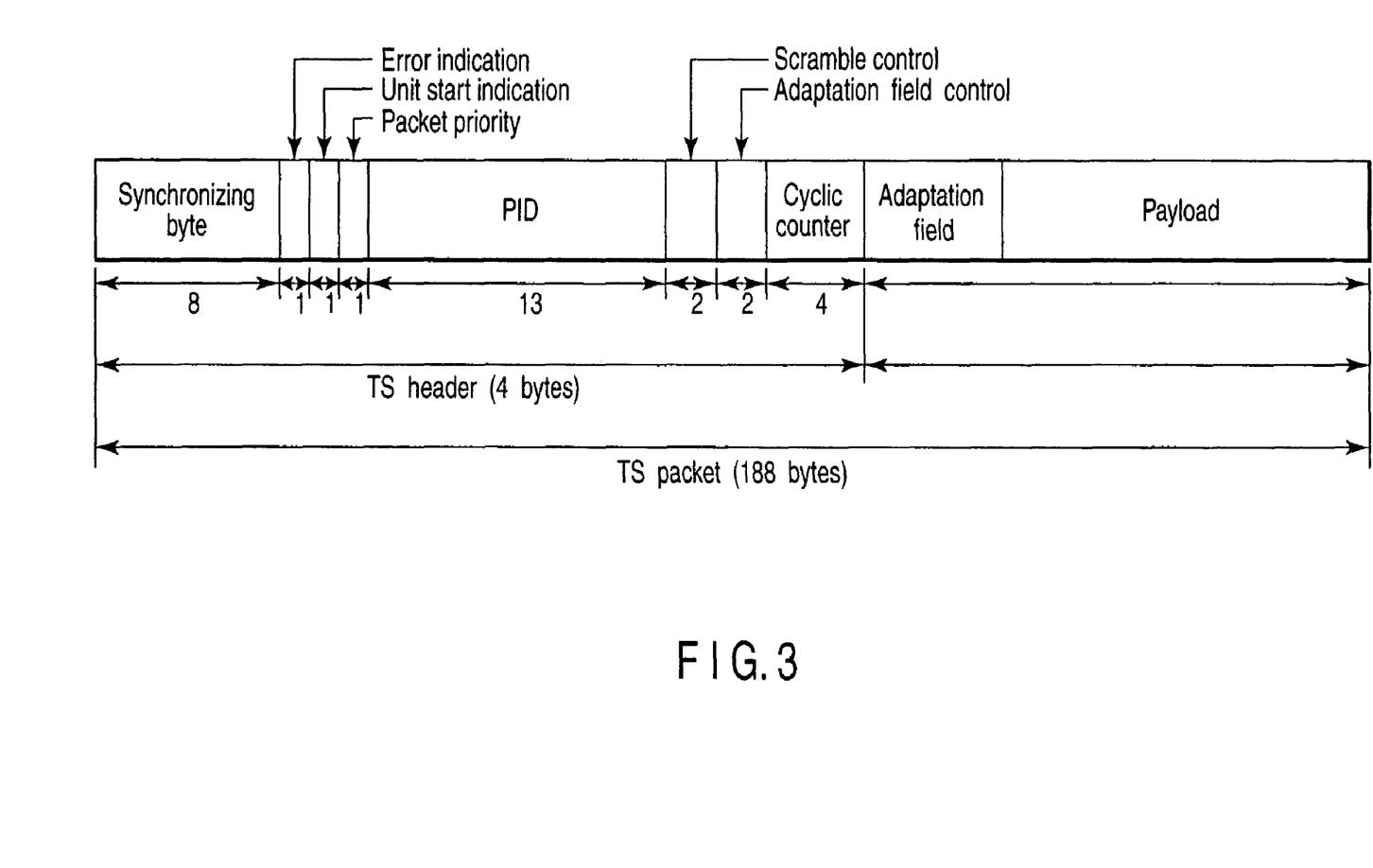
FIG. 3 is an exemplary diagram showing the structure of a TS packet constituting broadcast program data received by the computer in FIG. 1.

In one embodiment, the transport stream contains broadcast content encrypted by the encryption key (Ks) as well as the EMM, ECM, and the like. The transport stream is comprised of a plurality of consecutive TS packet groups. Each TS packet has a fixed length of 188 bytes as shown in FIG. 3. The TS packet is comprised of a header and a payload. The header is sized to have a fixed length of 4 bytes. The header contains a 13-bit packet ID (PID). The PID is a packet identifier used to identify the corresponding TS packet. Specifically, the PID is used to identify a program, a content type (audio/video), the EMM/ECM, or control information such as a program table. The TS packet groups belonging to the same broadcast program have a PID specified by the program table for that broadcast program.

The copyright protection LSI 203 is a dedicated LSI that protects the copyright of broadcast contents (rights management and protection [RMP]). The copyright protection LSI 203 pre-stores the device ID and device key Kd corresponding to the computer 10. The copyright protection LSI 203 uses ECM and EMM contained in the transport stream as well as the device key (Kd) to generate an encryption key (Ks). The copyright protection LSI 203 uses the encryption key (Ks) to decrypt broadcasting contents to cancel the encryption of the broadcasting contents.

The copyright protection LSI 203 also has a PID filtering function for extracting the TS packet group containing the PID corresponding to the target broadcast program, from the decrypted transport stream. The PID filtering function enables only the TS packet group corresponding to the broadcast program to be viewed or recorded, to be sent to the TV application program. This eliminates the need for the PID filtering process, which is otherwise executed by the TV application program. The load on the TV application program can thus be reduced. The amount of data flowing over the PCI bus can be reduced by allowing the copyright protection LSI 203 to execute the PID filtering process.

The copyright protection LSI 203 has a function for encrypting the TS packet group extracted by the PID filtering function. The encryption is executed using the encryption key retained by the copyright protection LSI 203 and TV application program as a common key. The encryption enables the encrypted program content to be transferred to the main memory 103 via the PCI bus. Thus, even if the program content is illegally extracted via the PCI bus, the extracted content can be prevented from being reproduced.

The analog TV broadcast reception processing section 118 is a device that receives analog broadcast programs such as for terrestrial analog TV broadcasting. The analog TV broadcast reception processing section 118 is connected to the antenna terminal 20. As shown in the figure, the analog TV broadcast reception processing section 118 includes an analog TV tuner 301 and an MPEG-2 encoder 302. The analog TV tuner 301 is a tuner module that receives analog broadcast programs and receives a broadcast signal for a particular channel included in TV broadcast signals input through the antenna terminal 20. The broadcast program data received by the analog TV tuner 301 is sent to the MPEG-2 encoder 302, which compressively encodes the broadcast program data using an encoding scheme that complies with the MPEG-2 standard. The MPEG-2 encoder 302 thus multiplexes the compressively encoded video data and audio to generate a program stream (PS).

Figure 4:
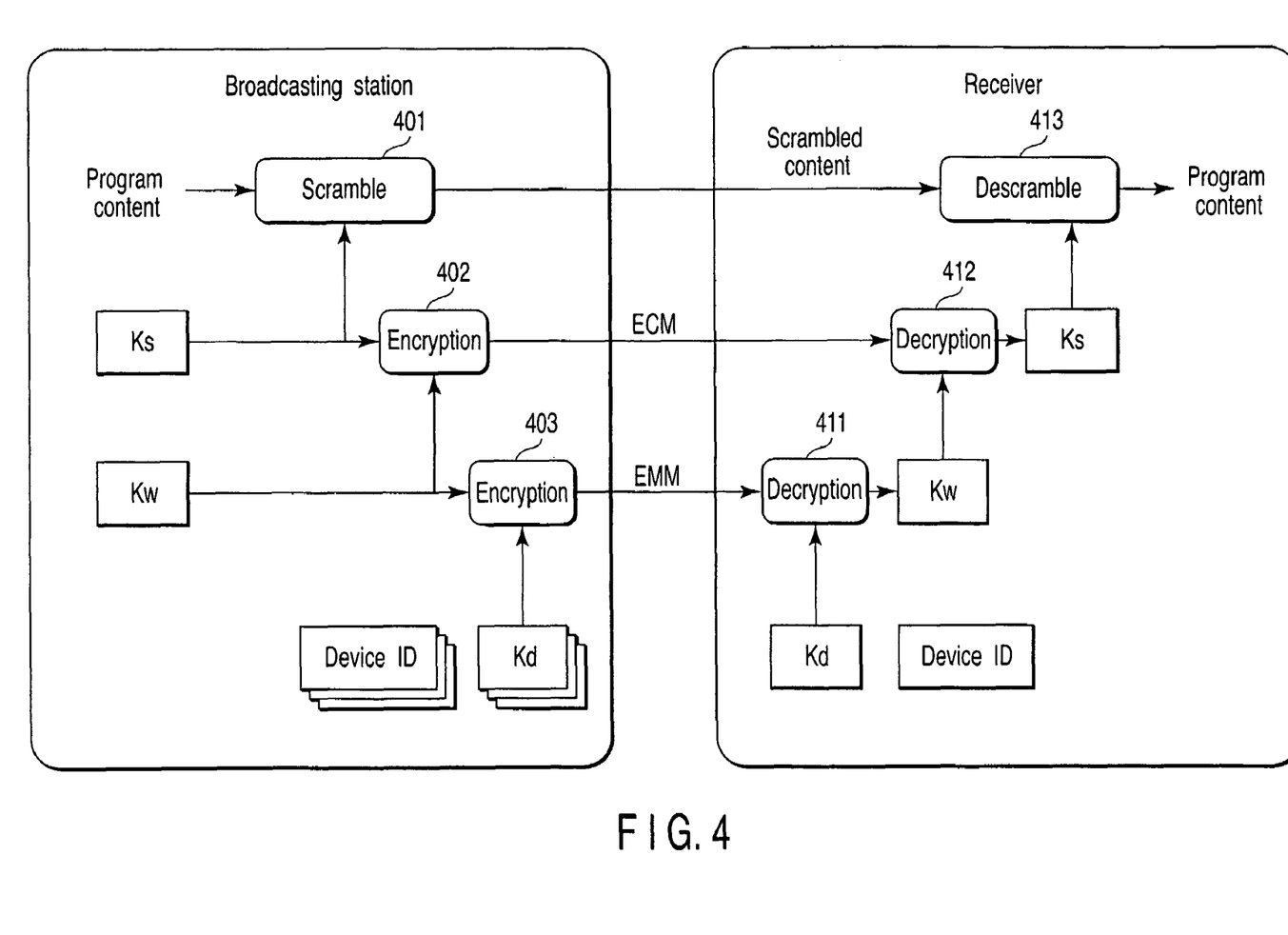
FIG. 4 is an exemplary diagram illustrating a process of decrypting broadcast content, the process being executed by the computer in FIG. 1.

Now, with reference to FIG. 4, description will be given of a mechanism for encrypting and decrypting broadcast content.

A broadcasting station is provided with an encryption processing section 401 and encrypting sections 402 and 403. The broadcasting station manages the device ID and device key Kd for each proper receiver type and for each manufacturer. The encryption processing section 401 uses the encryption key Ks to encrypt broadcast program data (for example, program content). The encrypting section 402 uses the work key Kw to encrypt the encryption key Ks, thus generating an ECM which comprises the encrypted encryption key Ks. The encrypting section 403 uses a plurality of device keys Kd corresponding to the respective device IDs to encrypt the work key Kw. The encrypting section 403 thus generates a plurality of EMMs containing the respective encrypted work keys Kw. In this case, each EMM is additionally provided with the corresponding device ID. The encryption key Ks and work key Kw are encrypted using, for example, the Advanced Encryption Standard (AES).

The copyright protection LSI 203 of the computer 10 includes an EMM decrypting section 411, an ECM decrypting section 412, and a decryption section 413. The EMM decrypting section 411 uses the device key Kd stored in the copyright protection LSI 203 to decrypt the EMM, thus generating a work key Kw. In this case, the EMM decrypting section 411 identifies one of a plurality of EMMs which correspond to the device ID of the computer 10. The EMM decrypting section 411 then uses the device key Kd to decrypt the identified EMM. The ECM decrypting section 412 uses the work key Kw generated to decrypt an ECM, thus generating a encryption key Ks. The decryption section 413 uses the encryption key Ks to decrypt the program contents.

Figure 5:
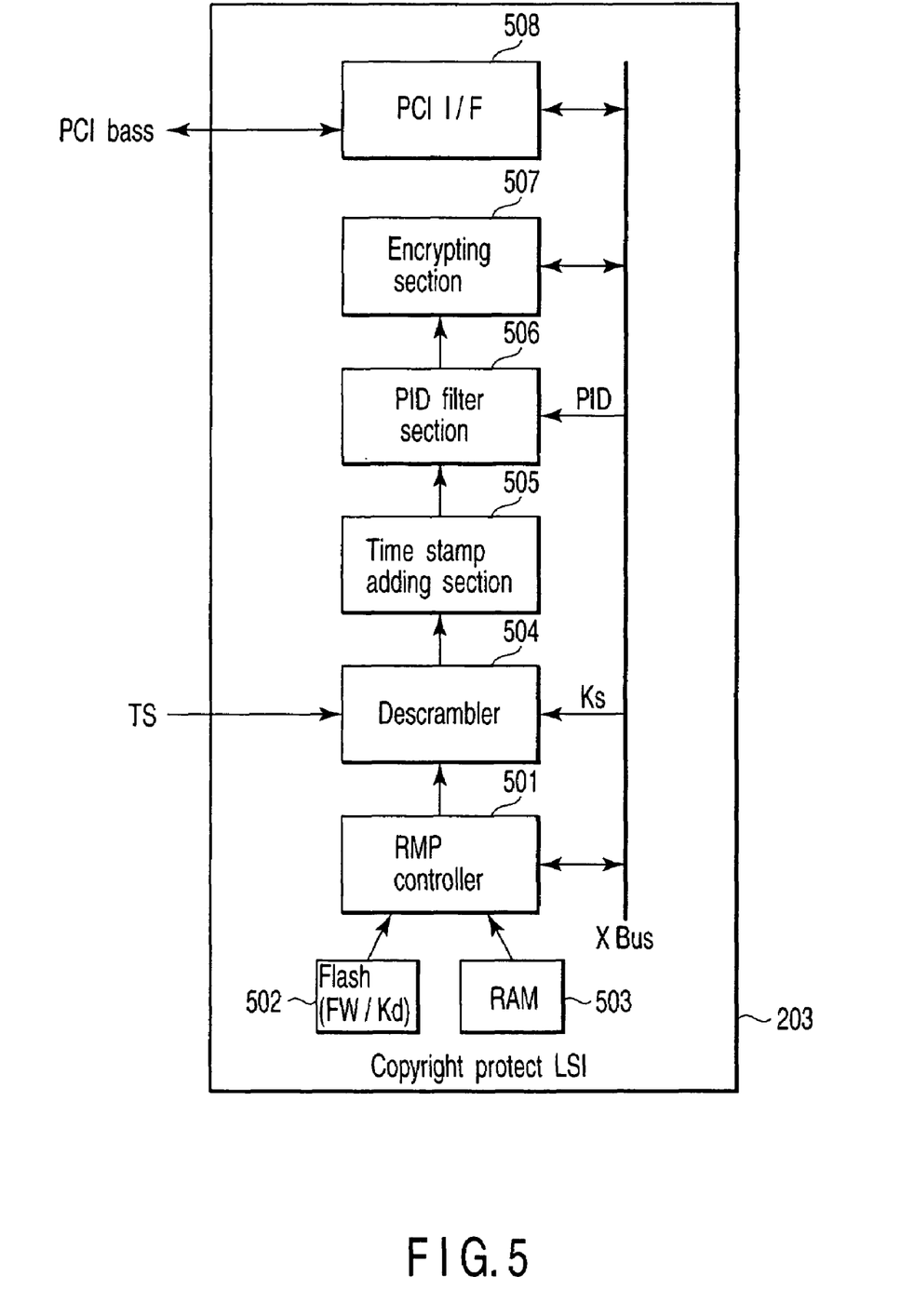
FIG. 5 is an exemplary block diagram showing the configuration of a copyright protection LSI provided in the computer in FIG. 1.

Now, with reference to FIG. 5, description will be given of one embodiment of the copyright protection LSI 203.

As shown in the figure, the copyright protection LSI 203 comprises an RMP controller 501, a flash EEPROM 502, RAM 503, a decoder 504, a time stamp adding section 505, a PID filter section 506, an encrypting section 507, and a PCI interface section 508.

The RMP controller 501 is a microcomputer that controls the operation of the copyright protection LSI 203. The RMP controller 501 executes a process for generating an encryption key Ks.

In one embodiment, the flash EEPROM 502 is a nonvolatile memory which stores the device key Kd together with the device ID and which also stores firmware that operates the RMP controller 501. In other embodiments, the flash EEPROM 502 may be replaced with one or more of the following: a RAM, a ROM, an optical storage device, a magnetic storage medium, a hard disk, and a volatile memory device.

RAM 503 is used as a work memory for the RMP controller 501. In other embodiments, RAM 503 may be replaced with one or more of the following: a flash EEPROM, a volatile memory device, a non-volatile memory device, a ROM, a magnetic storage medium, an optical storage disk, and a hard disk.

The decoder 504 uses the encryption key Ks generated by the RMP controller 501 to decrypt an encrypted transport stream (TS). A decrypted TS packet is sent to the time stamp adding section 505, which adds a 4-byte time stamp to the leading end of the decrypted 188-byte TS packet to generate a 192-byte packet. The time stamp indicates the temporal order of TS packets. By allowing the time stamp adding section 505 to convert the TS packet into a 192-byte packet with a time stamp, it is possible to allow the encrypting section 507 to efficiently execute an encrypting process.

The PID filter section 506 is a filter circuit that monitors the PID of the TS packet to extract only the TS packet group required to reproduce the program to be viewed. In other words, on the basis of the PID of each of the TS packet groups contained in the decrypted transport stream, the PID filter section 506 extracts one of the TS packet groups contained in the transport stream which corresponds to broadcast program data to be viewed. The program to be viewed is indicated by CPU 101. Each packet extracted by the PID filter section 506 is sent to the encrypting section 507.

The encrypting section 507 encrypts each 192-byte packet. In one embodiment, the encryption is executed using the same AES scheme as that used for the ECM and EMM. In one implementation, the encrypting section 507 uses an encryption key of block size 128 bits to encrypt the 192-byte packet for each 128-bit block. For example, the 192-byte packet is divided into 12 blocks each of length 128 bits, which are individually encrypted. Each encrypted TS packet with a time stamp is sent to the PCI interface section 508.

A calculating circuit in the encrypting section 507 which corresponds to the AES scheme is also utilized for calculations required to decrypt the ECM and EMM. Specifically, the RMP controller 501 receives the EMM from the PID filter section 506. The RMP controller 501 then inputs the EMM and the device key Kd to the encrypting section 507 to allow the encrypting section 507 to decrypt the EMM. This enables the RMP controller 501 to acquire the work key Kw from the encrypting section 507. The RMP controller 501 also receives the ECM from the PID filter section 506. The RMP controller 501 then inputs the ECM and the work key Kw to the encrypting section 507 to allow the encrypting section 507 to decrypt the ECM. This enables the RMP controller 501 to acquire the encryption key Ks from the encrypting section 507.

Because the RMP controller 501 uses the encrypting section 507 to decrypt the EMM and ECM, the circuit implementation is simplified. In particular, there is no need to mount a calculating circuit for AES encryption in the RMP controller 501.

For the firmware, carried out by the RMP controller 501 in the copyright protection LSI 203 to execute a predetermined process, a new version may be provided in order to improve its functions. Updating of the firmware will be described below.

Figure 6:
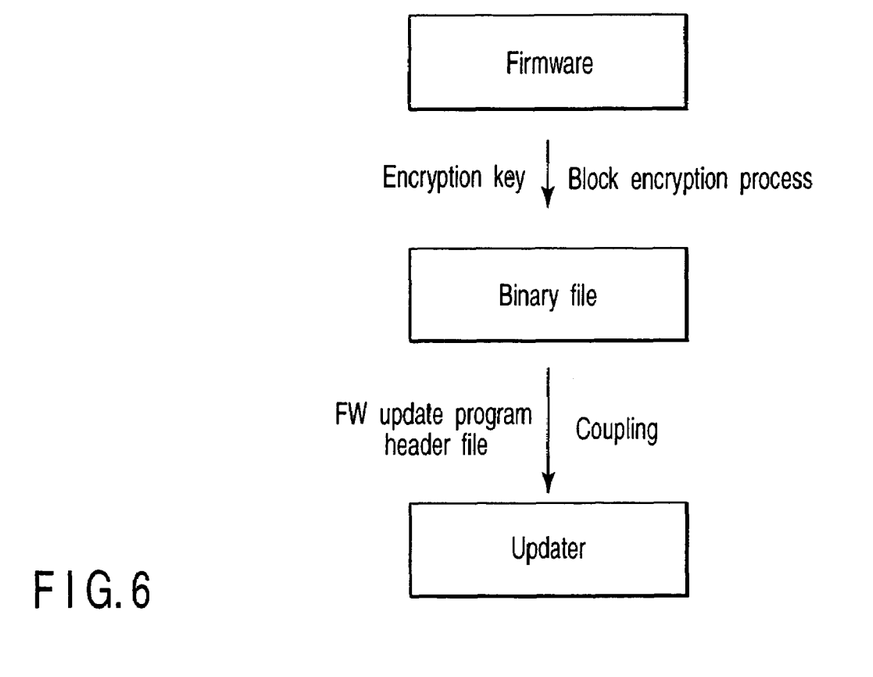
FIG. 6 is an exemplary diagram showing a method for creating an updater that updates firmware stored in a flash EEPROM in the copyright protection LSI.

First, creation of one embodiment of an updater will be described with reference to FIG. 6. A new version of firmware is created which is to be actually written to the flash EEPROM 502. Then, a binary file is created which contains encrypted code for the new firmware.

The firmware is encrypted by block encryption such as a cipher block chain (CBC) mode of the advanced encryption standard (AES). In one embodiment, the block encryption encrypts and decrypts each data of a fixed length called a block. In other embodiments, the block encryption encrypts and decrypts a region of the flash EEPROM 502 which may be of any size including, but not limited to, 1 bit, 1 byte, 800 bytes, 10 megabytes, or 1 gigabyte. The AES encrypts and decrypts each block of block length 128 bits. In some embodiments, the AES allows the key length to be selected from 128, 192, and 256 bits.

In the CBC mode, an encrypted plain text block is superimposed on the next plain text block by an XOR calculation. The result is then encrypted using a common key. To encrypt the first block, the last block of the preceding encrypted text or an externally provided initial vector is utilized. For decryption, the preceding encrypted block is used for data obtained by decrypting a block, to obtain a plain text block.

Figure 7:
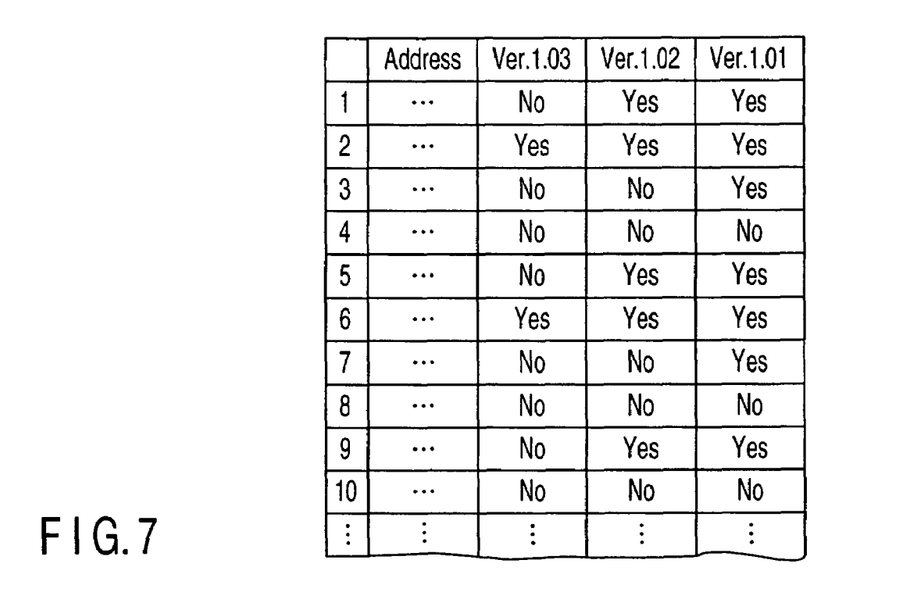
FIG. 7 is an exemplary diagram showing an example of a rewrite table contained in the updater.

Then, the apparatus determines whether or not each block for block encryption is different from the old version. If the block is different from the old version, the flash EEPROM 502 needs to be rewritten. In one embodiment, after all the regions are checked, a table is created which shows whether or not to rewrite the memory for each block. Blocks that need to be rewritten correspond to one or more addresses in the flash EEPROM 502. FIG. 7 shows an example of a rewrite table.

The binary file, update module, and header file are then coupled together by compressing them in a self-decompressing .exe format. An updater is thus created. The header file contains firmware version information, key information required to decrypt the binary file, and the rewrite table.

To update firmware, the user can download the updater from an appropriate Web server via the Internet. The user then stores the updater in the hard disk drive 103 and executes the downloaded updater. In other embodiments, the updater may be stored on one or more of the following: a RAM, a volatile memory, a non-volatile memory, an optical storage disk, and a magnetic storage medium.

Figure 8:
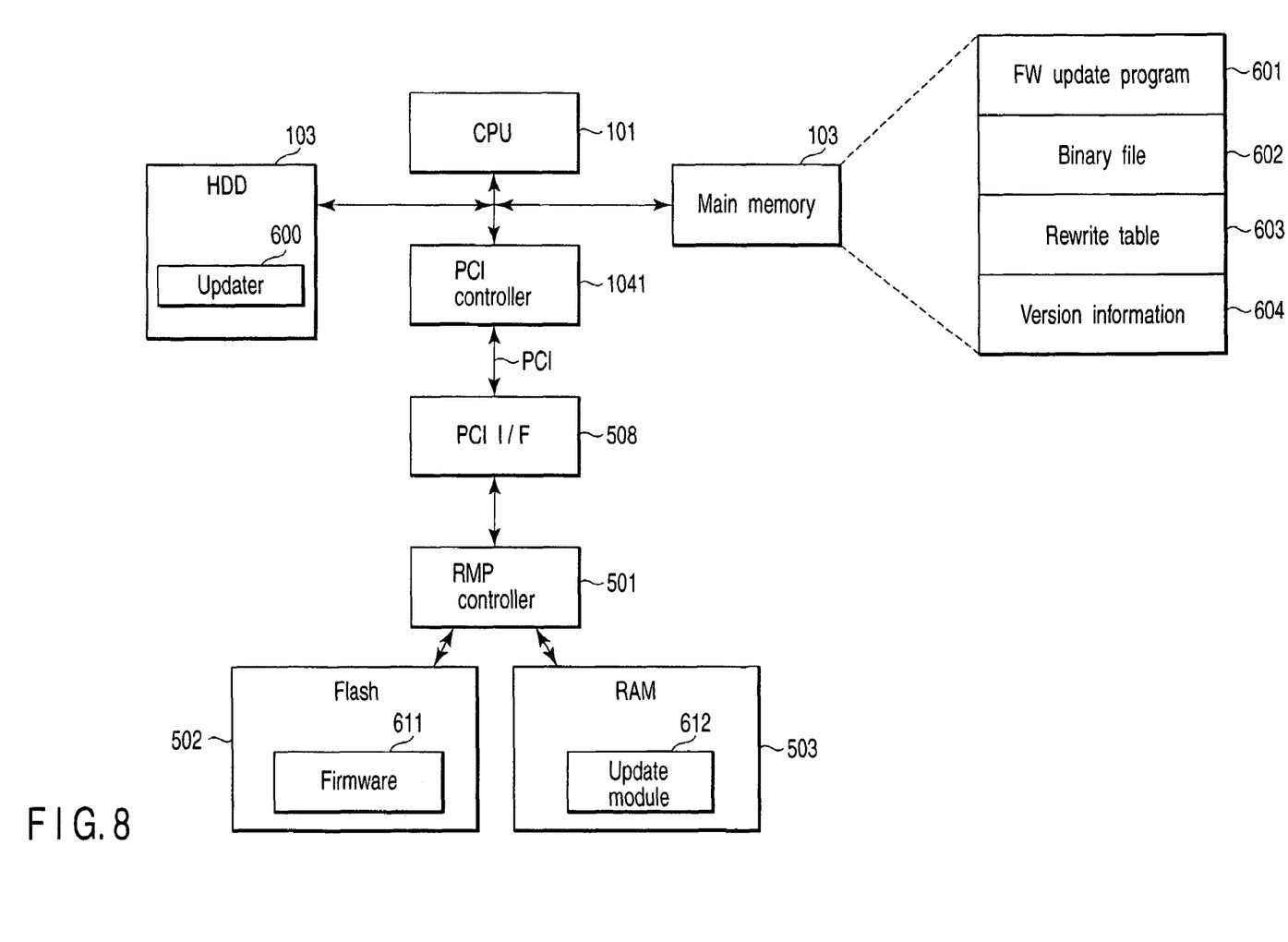
FIG. 8 is an exemplary block diagram showing a configuration for updating firmware.
Figure 9:
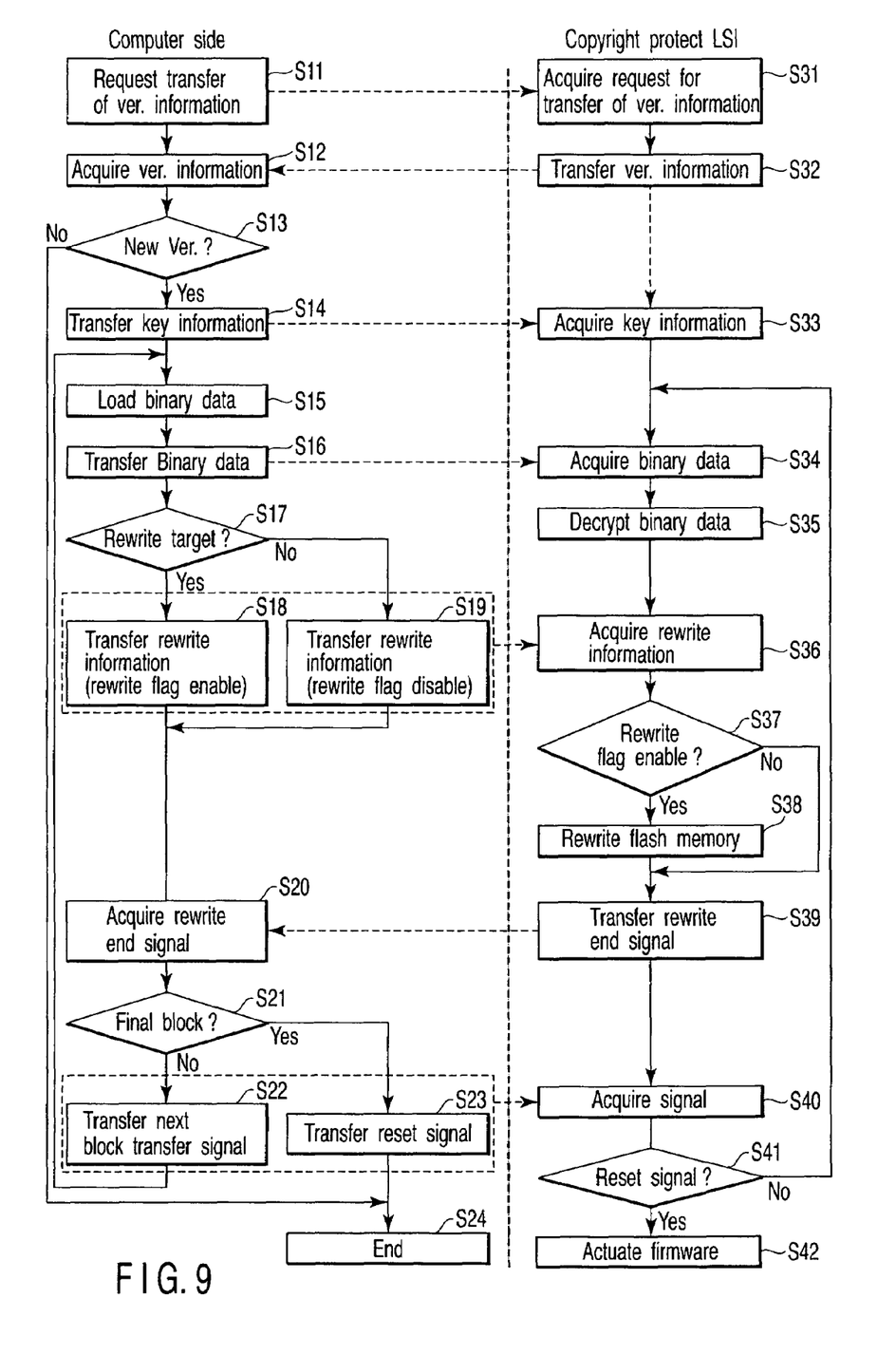
FIG. 9 is an exemplary flowchart showing an example of a method for updating firmware.

One embodiment of an update process will be described with reference to the block diagram in FIG. 8 and the flowchart in FIG. 9.

The user executes an updater 600 stored in the hard disk drive 103. The updater 600 is decompressed to expand a firmware (FW) update program 601, a binary file 602, a rewrite table 603, and version information 604 into the main memory 103. The FW update program 601 is automatically executed by the CPU 101. In the copyright protection LSI 203, an operation of updating firmware is performed by the update module 612 expanded in RAM 503.

CPU 101 requests, via the PCI bus, the RMP controller 501 to transfer version information on the firmware (step S11). Upon acquiring the request for transfer of version information (step S31), the RMP controller 501 transfers the version information on firmware 611 stored in the flash EEPROM 502 (step S32).

Upon acquiring the version information (step S12), the CPU 101 compares the version information 604 in the update file with the version information acquired. The CPU 101 thus determines whether or not the version in the update file is newer than the firmware stored in the flash EEPROM 502 (step S13). If the version in the update file is the same as or older than the firmware (No in step S13), the update process ends (step S24).

If the version in the update file is new (Yes in step S13), the CPU 101 uses a challenge response scheme or the like to transfer key information 605 to the RMP controller 501 via the PCI bus (step S12). The key information 605 is used to decrypt the binary data contained in the header file. The RMP controller 501 acquires the key information transferred by the program (step S33).

The CPU 101 reads data of the block length size for a block encrypting process from a binary file 602 starting from the leading end of unread regions (step S15). The CPU 101 transfers the read data to the RMP controller 501 via the PCI bus as binary data (step S16).

The RMP controller 501 acquires and stores the binary data transferred by the CPU 101, in RAM 503 (step S34). The RMP controller 501 then uses the key information acquired in step S33 and the initial vector or the binary data in the preceding block to decrypt the binary data (step S35). The decryption is carried out using the encrypting section 507.

CPU 101 refers to the rewrite table 603, contained in the header file, to determine whether or not the data obtained by decrypting the binary data transferred to the RMP controller 501 is a rewrite target for rewrite of the flash EEPROM 502 (step S17). This may depend on the version of the firmware stored in the flash EEPROM 502. Thus, whether or not the data is to be rewritten is determined depending on the version of the firmware acquired in step S12.

If the data is to be rewritten (Yes in step S17), rewrite information containing a rewrite flag (enable) and an address in the flash memory is transferred to the RMP controller 501.

If the data is not to be rewritten (No in step S17), rewrite information containing a rewrite flag (disable) is transferred to the RMP controller 501.

Then, the RMP controller 501 acquires the rewrite information (step S36). The RMP controller 501 determines whether or not the rewrite flag indicates "enable" (step S37). If the rewrite flag indicates "enable" (Yes in step S37), the RMP controller 501 uses the decrypted data to rewrite the region of the flash EEPROM 502 which corresponds to the transferred address (step S38).

After the processing in step S38 or if the rewrite flag does not indicate "enable" (No in step S37), the RMP controller 501 transfers a rewrite end signal to notify the CPU 101 that the rewrite has ended (step S39). If the rewrite flag does not indicate "enable", that is, the rewrite flag indicates "disable", then the rewrite end signal is transferred without rewriting the flash EEPROM 502.

Upon acquiring the rewrite end signal (step S20), the CPU 101 determines whether or not the transferred binary data corresponds to the final block of the binary file 602 (step S21). If the binary data does not correspond to the final block (No in step S21), CPU 101 transfers the next block transfer signal to the RMP controller 501 (step S22). The RMP controller subsequently sequentially executes the processing from step S15 to step S21. If the binary data corresponds to the final block (Yes in step S21), a reset signal is transferred to the RMP controller 501 (step S23) to end the process (step S24).

Upon acquiring the signal (step S40), the RMP controller 501 determines whether or not the signal acquired is a reset signal (step S41). If the signal acquired is not a reset signal (No in step S41), the RMP controller 501 waits for the data in the next block to be transferred. If the signal acquired is a reset signal (Yes in step S41), the RMP controller 501 transfers the updated firmware to the memory and then executes it.

As described above, for regions that need not be rewritten, the copyright protection LSI 203 executes only decryption and skips writing to the flash EEPROM 502. The firmware can thus be updated by using one encrypted binary file and rewriting only the regions to be rewritten.

When the entire firmware is encrypted as one file to rewrite the entire flash EEPROM 502, regions that otherwise need not be rewritten are also rewritten. Accordingly, even if only a few regions are to be rewritten, the entire nonvolatile memory is rewritten, thus requiring extra time for the update process. The number of times that the flash EEPROM 502 is rewritten also adds to reduction of the life of the memory. However, by skipping the regions that need not be rewritten, while rewriting only the rewrite target regions, as described above, it is possible to reduce the time required for the update process. Further, the life of the flash EEPROM 502 may be extended.

Separate encrypted files may be provided which correspond to the respective update target regions of the firmware, with only the update target regions in the flash EEPROM 502 rewritten. However, this requires a plurality of binary files depending on the versions of the firmware that may be stored in the flash EEPROM 502. The time and effort required to create binary files increases with the degree of distribution of the update target regions. However, in one embodiment, only one binary file is needed thus reducing the time and effort required to create the binary file.

Data that cannot be easily embedded in the binary file can be easily rewritten by applying the above embodiment to update the firmware. The data includes a checksum and an update date in the flash EEPROM. In one implementation, a checksum value can be embedded in the binary file by creating a binary file, calculating a checksum, and recreating a binary file. However, this requires a large amount of time and effort because two binary files need to be created.

For example, to update the firmware to rewrite the checksum value in addition to the binary data, the following procedure may be used.

For preparation, a checksum portion is provided in the binary file as dummy data, and the binary file is encrypted. After the binary file is created, the checksum is calculated with its value held in the firmware update program.

To execute FW updating to rewrite appropriate regions of the flash EEPROM, only decryption is executed on the checksum portion and rewriting it is skipped. The checksum value may be rewritten after the binary file has been written to the flash EEPROM.

While certain embodiments of the inventions have been described, these embodiments have been presented by way of example only, and are not intended to limit the scope of the invention. Indeed, the novel methods and systems described herein may be embodied in a variety of other forms; furthermore, various omissions, substitutions and changes in the form of the methods and systems described herein may be made without departing from the spirit of the invention. The accompanying claims and their equivalents are intended to cover such forms or modifications as would fall within the scope and spirit of the inventions.

What is claimed is:

1. An information processing apparatus comprising:
a memory in which first firmware is stored;
a first controller to execute the firmware;
a storage device configured to store update data having a plurality of blocks corresponding to second firmware that can be used to update the first firmware stored in the memory, and rewrite information indicating whether or not to rewrite a region in the memory for each block of the update data, the update data being grouped into the plurality of blocks which are encrypted using a block encryption scheme;
a processing unit configured to (a) transfer each block of the update data, and (b) indicate whether the region in the memory corresponding to the transferred block of the update data requires updating, based on the rewrite information every time a block of the update data is transferred; and a second controller comprising an updating unit and a decoder, the decoder configured to decrypt each block of the update data transferred from the processing unit, the updating unit configured to rewrite an appropriate region in the memory using the decrypted block in response to the indication of the region of the memory requiring updating.

2. The information processing apparatus according to claim 1, wherein the update data corresponding to the second firmware is stored in one or more regions.

3. The information processing apparatus according to claim 1, wherein the memory comprises a nonvolatile memory.

4. An expansion device configured to connect to an expansion slot in an information processing apparatus, the expansion device comprising:
- a nonvolatile memory in which firmware is stored;
- a first controller that executes the firmware; and
- a second controller configured to receive each block of update data, the update data having a plurality of blocks corresponding to second firmware that can be used to update the first firmware stored in the nonvolatile memory, and rewrite information indicating whether or not to rewrite a region in the memory for each block of the update data, the update data being grouped into the plurality of blocks which are encrypted using a block encryption scheme, the second controller comprising a decoder and an updating unit, the decoder configured to decrypt each block of the update data transferred from the information processing apparatus, the updating unit configured to acquire an instruction based on the rewrite information, and to rewrite an appropriate region in the nonvolatile memory using the decrypted block if the instruction indicates that the nonvolatile memory is to be rewritten.

5. A method for updating firmware in an expansion device, comprising:
- providing update data having a plurality of blocks corresponding to a second firmware for updating a first firmware stored in a plurality of regions of a memory and information indicating whether or not to rewrite the memory for each block supplied with the update data, the update data being grouped into a plurality of blocks which are encrypted using the block;
- transferring a block of the update data from an information processing apparatus to a controller in the expansion device;
- indicating, by the apparatus, whether or not to rewrite the region of the memory using the transferred block of the update data based on the information;
- decrypting, by the controller, each block of the update data transferred from the apparatus; and
- rewriting, by the controller, an appropriate region in the nonvolatile memory using the decrypted block if an instruction indicates that the nonvolatile memory is to be rewritten.

* * * * *